No. 663,518. Patented Dec. 11, 1900.
R. SCHEIDLER.
MECHANISM FOR PROPELLING AND GUIDING TRACK ENGAGING CARRIAGES.
(Application filed Mar. 29, 1900.)
(No Model.)
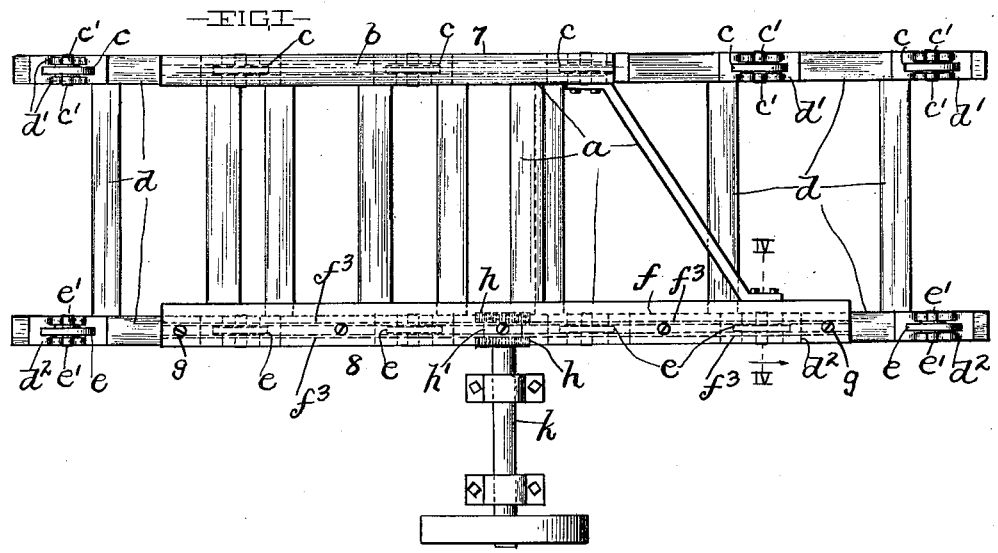
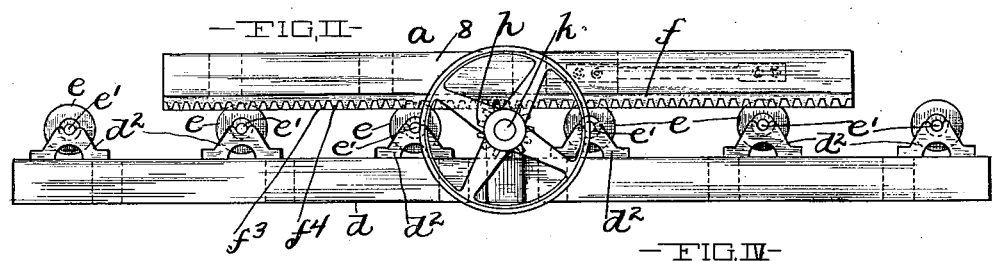
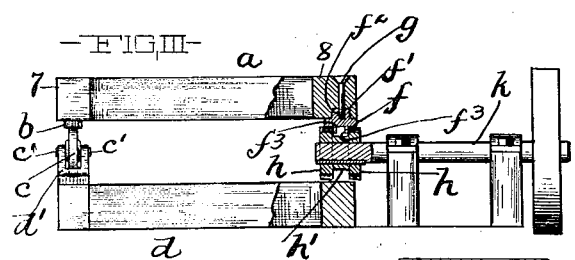
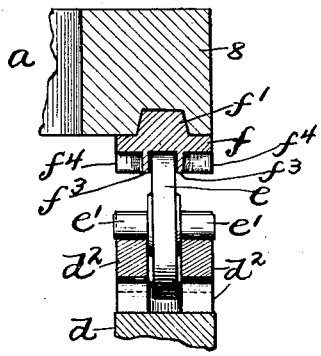
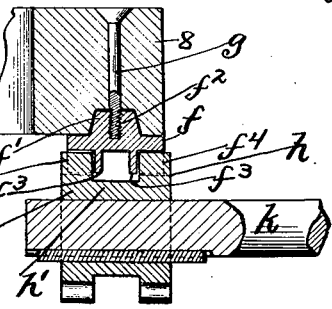
WITNESSES:
Daniel E. Daly.
Victor C. Lynch
INVENTOR
Reinhard Scheidler
BY Lynch & Dorer
his ATTORNEYS

UNITED STATES PATENT OFFICE.

REINHARD SCHEIDLER, OF NEWARK, OHIO.

MECHANISM FOR PROPELLING AND GUIDING TRACK-ENGAGING CARRIAGES.

SPECIFICATION forming part of Letters Patent No. 663,518, dated December 11, 1900.

Application filed March 29, 1900. Serial No. 10,616. (No model.)

*To all whom it may concern:*

Be it known that I, REINHARD SCHEIDLER, a resident of Newark, county of Licking, and State of Ohio, have invented certain new and useful Improvements in Mechanism for Propelling and Guiding Track-Engaging Carriages or Vehicles; and I do hereby declare the following to be a full, clear, and exact description of the invention, such as will enable others skilled in the art to which it pertains to make and use the same.

My invention relates to improvements in mechanism for propelling and guiding carriages or vehicles used in carrying logs or other objects that are to be operated upon by a saw or other tool or machine; and the invention pertains more especially to a carriage that is mounted upon and propellable along a straight track and to improved mechanism for propelling the carriage along the track and for positively preventing the slightest displacement of the carriage laterally of the track during the propulsion of the carriage and during the sawing or other operation upon the log or other object borne by the carriage.

With this object in view and to the end of attaining other advantages hereinafter appearing the invention consists in certain features of construction and combinations of parts hereinafter described, and pointed out in the claims.

In the accompanying drawings, Figure I is a top plan of a carriage and carriage propelling and guiding mechanism embodying my invention. Fig. II is a side elevation of the same. Fig. III is an end elevation, largely in transverse section. Fig. IV is an enlarged transverse section on line IV IV, Fig. I, looking in the direction of the arrow. Fig. V is an enlarged transverse section showing the operative connection of the carriage with the carriage-propelling shaft.

Referring to the drawings, $a$ designates the body portion or framework of the carriage, that comprises, preferably, two side timbers 7 and 8, that are parallel and arranged a suitable distance apart and in a horizontal plane and longitudinally of the carriage and are connected together by any suitable number of transversely-arranged timbers, bars, or braces. One of the side members of the carriage $a$, and member 7 in the case illustrated, is provided upon its under side with a metallic bar $b$, that extends longitudinally of and is suitably secured to the said member 7 in any approved manner. The bar $b$ rests and is movable upon a series of wheels or rollers $c$, that are arranged at suitable intervals longitudinally of the path of the carriage and are arranged, furthermore, with their axes arranged horizontally and at right angles to the said path. The rollers or wheels $c$ are provided with trunnions $c'$, that have bearing in housings or boxes $d'$, rigid with and built upon a horizontally-arranged stationary frame $d$, that is arranged below and longitudinally of the path of the carriage. The stationary frame $d$ is provided with another series of wheels or rollers $e$, that are arranged at suitable intervals longitudinally of and below the side member 8 of the carriage and have their axes parallel and arranged at right angles to the path of the carriage. The wheels or rollers $e$ have trunnions $e'$, that are journaled in boxes or housings $d^2$, rigid with and built upon the frame $d$. Obviously, therefore, the carriage $a$ is mounted upon two series of wheels or rollers. The said series of wheels or rollers are arranged a suitable distance apart and longitudinally of the path of the carriage, and the rollers or wheels of each series are arranged at suitable intervals longitudinally of the said path, and the carriage is capable of being propelled upon the said rollers or wheels longitudinally of the frame $d$.

The side timber 8 of the carriage $a$ is provided upon its under side with a metallic bar $f$, that is arranged longitudinally of the said member 8, and is provided upon its upper side with a reinforcing rib or flange $f'$, that extends longitudinally of the bar $f$ and engages a corresponding groove or channel formed in the under side and extending longitudinally of the timber 8, and the bar $f$ is secured to the timber 8, preferably removably, by means of bolts or screws $g$, that extend vertically through the timber 8 from the top of the said timber, having their heads countersunk within the upper portion of the timber and having their screw-threaded shanks engaging correspondingly-threaded holes $f^2$, formed in the rib or flange $f'$. The sides of the flange or rib $f$ and the corresponding side walls of the engaging groove or channel 10 are preferably beveled to facilitate the introduction of the said flange into the timber 8 and to improve the fit between the said flange and the engaging timber. The beveling of the sides of the flange affords the advantages already indicated without materially reducing the strength of the said flange or rib, because the latter is thickest next to the body portion of the bar $f$.

The bar $f$ is provided upon its under side with two depending parallel flanges $f^3$ and $f^3$, that are arranged a suitable distance apart centrally between the two longitudinal edges of the bar and extend longitudinally of the said bar. The arrangement of parts is such that the flanges $f^3$ and $f^3$ are arranged at opposite sides, respectively, of the series of rollers or wheels $e$ and contiguous or in close proximity thereto, and consequently the said flanges $f^3$ and $f^3$ and the interposed rollers or wheels $e$ form guides for preventing lateral displacement of the carriage $a$ in either direction.

Two racks $f^4$ and $f^4$ are formed upon the lower side of the bar $f$ at the outer side of the different flanges $f^3$ and $f^3$, respectively, between the lower and free longitudinal edges of the said flanges and the body portion of the bar $f$. Two pinions $h$ and $h$ mesh with the different racks, respectively, and are operatively mounted upon a suitably-supported horizontally-arranged shaft $k$, that is driven in any approved manner. The two pinions $h$ and $h$ are formed, preferably, integral with each other, having a hub $h'$ in common. Obviously the flanges $f^3$ and $f^3$ are not only instrumental in preventing lateral displacement of the carriage $a$, but, as the different pinions extend into close proximity to the outer sides of the different flanges, respectively, prevent displacement of the pinions upon the pinion-bearing shaft.

By the construction hereinbefore described it is obvious that the carriage $a$ cannot possibly become displaced laterally in either direction, that the construction is exceedingly simple and durable, and the operation of the operative connection between the carriage and the pinion-bearing shaft is reliable and comparatively noiseless.

What I claim is—

1. The combination of the two parallel series of rollers or wheels, the body portion or framework of the carriage propellably mounted upon the said rollers or wheels and comprising a timber arranged above and longitudinally of one of the said series of rollers or wheels, a metallic bar $f$ arranged at and longitudinally of the under side of the said timber and provided, upon its upper side, centrally between its side or longitudinal edges, with a reinforcing rib or flange $f'$ extending into and longitudinally of the aforesaid timber, which bar is provided, upon its under side, with two depending parallel flanges extending longitudinally of the bar, and the last-mentioned rollers or wheels extending between the said flanges, substantially as shown, for the purpose specified.

2. The combination, with two parallel series of rollers or wheels, and the body portion or framework of a carriage that is propellably mounted upon the said rollers or wheels and comprises a timber arranged above and longitudinally of one of the said series of rollers or wheels, of a bar arranged at the under side and longitudinally of the said timber and having its upper side provided with a reinforcing rib or flange that has its sides beveled and conforms, in cross-section, to and engages a groove or channel formed in and arranged longitudinally of the lower side of the timber, which bar has its lower side provided with two depending flanges arranged opposite the aforesaid reinforcing flange or rib and arranged at opposite sides, respectively, and longitudinally of, and in close proximity to, the series of rollers or wheels arranged below the bar, substantially as and for the purpose set forth.

3. The combination, with two parallel series of rollers or wheels, and the body portion or framework of a carriage that is propellably mounted upon the said rollers or wheels and comprises a timber arranged above and longitudinally of one of the said series of rollers or wheels, of a bar arranged at the side and longitudinally of the said timber and having its upper side provided with a reinforcing rib or flange that extends into and longitudinally of the lower side of the timber and is provided with screw-threaded holes extending therethrough at suitable intervals longitudinally of the bar, which bar has its lower side provided with two depending flanges arranged opposite the aforesaid reinforcing flange or rib and arranged at opposite sides, respectively, and longitudinally of, and in close proximity to, the series of rollers or wheels arranged below the bar, and bolts or screws extending vertically through the aforesaid timber and having their shanks engaging the aforesaid holes, substantially as and for the purpose set forth.

4. The combination, with two parallel series of rollers or wheels, and the body portion or framework of the carriage propellably mounted upon the said rollers or wheels, of a metallic bar secured to the under side and arranged longitudinally of the said framework, which bar is provided, upon its lower side, with two parallel racks arranged a suitable distance apart, and two suitably-supported and suitably-driven pinions meshing with the different racks, respectively, and one of the aforesaid series of rollers or wheels being arranged between the racks at suitable intervals longitudinally of the carriage.

5. The combination, of two parallel series of rollers or wheels, the body portion or framework of a carriage propellably mounted upon the said rollers or wheels, a metallic bar secured to the under side and arranged longitudinally of the said framework, which bar is provided, upon its lower side, with two depending parallel flanges arranged a suitable distance apart and extending longitudinally of the bar, two racks formed upon the bar at the outer side of the different flanges, respectively, and the two pinions meshing with the different racks, respectively, and rotatable in unison, and one of the aforesaid series of rollers or wheels being arranged between the aforesaid flanges at suitable intervals longitudinally of the bar, substantially as shown, for the purpose specified.

6. The combination, with two parallel series of rollers or wheels, and the body portion or framework of a carriage that is propellably mounted upon the said rollers or wheels and comprises a timber arranged above and longitudinally of one of the said series of rollers or wheels, of a metallic bar arranged at and longitudinally of the under side of and secured to the said timber, which bar is provided, upon its under side, with two depending flanges arranged at opposite sides, respectively, and longitudinally of, and in close proximity to, the series of rollers or wheels arranged below the bar, two racks formed upon the bar at the outer side of the different depending flanges, respectively, between the lower and free longitudinal edge of the adjacent flange and the body portion of the bar, and two suitably-supported and suitably-operated pinions meshing with the different racks, respectively, and rigid with each other, substantially as shown, for the purpose specified.

Signed by me at Cleveland, Ohio, this 16th day of March, 1900.

REINHARD SCHEIDLER.

Witnesses:
C. H. DORER,
A. H. PARRATT.